Patented Dec. 25, 1951

2,579,455

UNITED STATES PATENT OFFICE 2,579,455

CRYSTALLIZATION OF LYSOZYME FROM EGG WHITE

Gordon Alderton, Albany, and Harry L. Fevold, Berkeley, Calif., assignors to the United States of America as represented by the Secretary of Agriculture No Drawing. Application May 9, 1947, Serial No. 747,119

10 Claims. (Cl. 195—66)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

This invention relates to the enzyme lysozyme (or lysozymes) and has among its objects the provision of methods of isolating this enzyme from egg white in a substantially pure, crystalline form and sufficiently free from contaminants to permit its use as a therapeutic agent in human and veterinary medicine.

The term "lysozyme" has been applied to a bacteriolytic agent found in the tissues of a number of species of animals, and available evidence indicates that it is a basic protein with a molecular weight near 18,000, stable when heated in acid solution but very heat-labile in alkali.

Previous chemical work on lysozyme has concerned its isolation from egg white by complex procedures involving organic solvents such as acetone and alcohol and formation of dye complexes with the lysozyme. These methods are laborious and expensive. Further, the lysozyme is obtained in small yields and low purity and is noncrystalline in form.

In our application Serial No. 635,813, filed Dec. 18, 1945, now Patent No. 2,442,452, issued June 1, 1948, we disclose and claim a process for separating lysozyme from egg white involving adsorption of the enzyme on bentonite or other adsorption agent and elution of the product by the use of aqueous pyridine or other extractant.

The instant process is an improvement on the process disclosed in our previous application.

We have found that crystalline lysozyme can be obtained in a single step from egg white merely by addition of a water-soluble inorganic salt to egg white, allowing the solution to stand, preferably with the addition of a small amount of crystalline lysozyme, and removing the lysozyme crystals which separate out of solution. Preferably, the pH of the solution is maintained on the alkaline side and the solution cooled while the crystallization takes place.

The following examples disclose particular steps, conditions and reagents within the scope of this invention but it is to be understood that these examples are given only by way of illustration and not limitation.

EXAMPLE 1

Egg white was freed from chalazae by filtering through cheesecloth and then homogenized. Sufficient potassium hydroxide was added to establish a pH of 10.5 and sufficient sodium chloride was added to establish a concentration of 5% thereof. After thorough mixing a small amount of crystalline lysozyme (about 50 mg. per 10 liters of egg white) from a previous batch was added to induce crystallization. The mixture was allowed to stand at 4° C. for 72 hours after which time the crystals of lysozyme were removed by filtration. Analysis indicated that 75% of the lysozyme originally present in the egg white had been obtained in crystalline form of 80–85% purity.

EXAMPLE 2

The process set forth in Example 1 was repeated employing different concentrations of sodium chloride. The following results were obtained:

Table 1

[Effect of salt concentration at pH 10.5, temperature 4° C., and time 72 hours.]

| Experiment No. | NaCl conc., per cent | Yield, per cent |
|---|---|---|
| 1 | 4 | 62 |
| 2 | 6 | 74 |
| 3 | 8 | 72 |

EXAMPLE 3

The process of Example 1 was repeated employing different pH's. The following results were obtained:

Table 2

[Effect of varying pH at NaCl concentration 5%, temperature 4° C., and time 72 hours.]

| Experiment | pH | Yield, per cent |
|---|---|---|
| 1 | 9.0 | 86 |
| 2 | 9.5 | 88 |
| 3 | 10.0 | 84 |
| 4 | 10.5 | 75 |
| 5 | 11.0 | 64 |

EXAMPLE 4

Egg white was freed from chalazae by filtering through cheesecloth and then homogenizing. Sufficient potassium hydroxide was added to establish a pH of 9.0 and sufficient sodium chloride was added to establish a concentration of 5% thereof. After thorough mixing a small amount of crystalline lysozyme (about 50 mg. per 10 liters of egg white) from a previous batch was added to promote crystallization. The mixture was allowed to stand at 4° C. for 20 hours after which time the crystals of lysozyme were removed by filtration. Analysis indicated that 72% of the lysozyme originally present in the egg white had been obtained in crystalline form of 80–85% purity.

EXAMPLE 5

The process of Example 4 was repeated using a pH of 9.5 and then with a pH of 10.0. Yields of 76% and 62%, respectively, were obtained.

As previously set forth, the process of this invention involves the crystallization of lysozyme from egg white by addition of a water-soluble inorganic salt to the egg white and allowing the mixture to stand preferably after adjustment of the pH thereof. Many different inorganic salts could be used such as potassium chloride, ammonium chloride, sodium bicarbonate, potassium bicarbonate, sodium carbonate, potassium carbonate, sodium chloride, potassium sulphate, ammonium sulphate, sodium sulphate, potassium nitrate, ammonium nitrate, sodium nitrate, etc. Any inorganic salt which is water-soluble at a pH of 8.5 to 12 is suitable. Our preferred salt is sodium chloride. The concentration of salt should be from about 3 to about 10%. We have obtained our best results at a concentration of 5%. The pH of the egg white and salt solution should be alkaline, preferably the pH should be from about 8.5 to about 12. For establishing alkaline conditions any base can be used such as sodium hydroxide, potassium hydroxide, ammonium hydroxide, etc. Since the natural pH of egg white is 8.5, it is not essential in many cases to alter the pH. Thus if a neutral salt such as sodium chloride or potassium chloride is added to the egg white, the pH will remain at 8.5 and no other reagent need be added. Further, if basic salts such as potassium carbonate, potassium bicarbonate, etc. are added then the salt will act both as a salting-out agent and as the pH-adjusting agent. We have found that the best results are obtained at a pH of 9 to 11. The temperature at which the mixture is permitted to stand should be below room temperature (20° C.). Generally, the crystallization is accomplished most rapidly from about 0° C. to about 5° C. It is usually necessary to seed the salt-egg white solution with lysozyme from a previous batch in order to induce crystallization; only a minute amount is necessary, i. e., about 5 mg. per liter. In some instances, however, the crystals will form spontaneously.

Although the product obtained in the process described above is in substantially pure state (about 85%), it can be further purified to remove occluded impurities by dissolving it in water, adding a water-soluble inorganic salt and adjusting the pH of the solution. The lysozyme is dissolved in sufficient water to give a concentration of about 5 to about 10%, and a water-soluble inorganic salt added in sufficient quantity to establish a concentration of about 3% to about 10%. Any of the water-soluble inorganic salts previously listed can be used. The pH of the solution may vary from 3 to 12. If the pH is adjusted to below 7 by addition of hydrochloric or other acid, the lysozyme will crystallize out of solution as the salt. Thus in the presence of hydrochloric acid, crystals of lysozyme hydrochloride will be obtained. At neutral and alkaline pH's the crystalline lysozyme itself is obtained.

It is evident that our process of obtaining crystalline lysozyme is extremely simple and inexpensive as it requires only the use of inorganic reagents in small quantities. Further, the egg white, after removal of the lysozyme, still contains valuable ingredients such as albumin and can be utilized for many purposes. Since no organic solvents or other toxic agents were employed, this residual material, after re-establishment of its natural pH if necessary, can be used for animal feeds and the like.

Although we prefer to use egg white from hen eggs as the cheapest and most convenient source, it is obvious that egg white from other eggs such as turkey eggs, duck eggs, goose eggs, etc., might be used.

Having thus described our invention, we claim:

1. The process of isolating crystalline lysozyme from egg white which comprises dissolving sufficient water-soluble inorganic salt in egg white to establish a concentration of about 3% to about 10% of the salt, allowing the solution to stand at a temperature below room temperature, and removing the lysozyme crystals which have separated from the solution.

2. The process of isolating crystalline lysozyme from egg white which comprises dissolving sufficient water-soluble inorganic salt in egg white to establish a concentration of about 3% to about 10% of the salt, adding a base to adjust the pH of the solution to about 8.5 to about 12, allowing the solution to stand at a temperature below room temperature, and removing the lysozyme crystals which separate out of solution.

3. The process of isolating crystalline lysozyme from egg white which comprises dissolving sufficient water-soluble inorganic salt in egg white to establish a concentration of about 3% to about 10% of the salt, allowing the solution to stand at a temperature from about 0° C. to about 5° C., and removing the lysozyme crystals which separate out of solution.

4. The process of isolating crystalline lysozyme from egg white which comprises dissolving sufficient water-soluble inorganic salt in egg white to establish a concentration of about 3% to about 10% of the salt, adjusting the pH to about 8.5 to about 12, allowing the solution to stand at a temperature from about 0° C. to about 5° C., and removing the lysozyme crystals which separate out of solution.

5. The process of isolating crystalline lysozyme from egg white which comprises dissolving sufficient water-soluble inorganic salt in egg white to establish a concentration of about 5% of the salt, adding a base to adjust the pH to about 9 to about 11, allowing the solution to stand at a temperature from about 0° C. to about 5° C., and removing the lysozyme crystals which separate out of solution.

6. The process of isolating crystalline lysozyme from egg white which comprises dissolving sufficient sodium chloride in egg white to establish a concentration of about 3% to about 10% of the sodium chloride, allowing the solution to stand at a temperature below room temperature and removing the lysozyme crystals which separate out of solution.

7. The process of isolating crystalline lysozyme from egg white which comprises dissolving sufficient sodium chloride in egg white to establish a concentration of about 3% to about 10% of the sodium chloride, adding a base to adjust the pH of the solution to 8.5 to 12, allowing the solution to stand at a temperature below room temperature, and removing the lysozyme crystals which separate out of solution.

8. The process of isolating crystalline lysozyme which comprises dissolving sufficient sodium chloride in egg white to establish a concentration of about 3% to about 10% of the sodium chloride, allowing the solution to stand at a temperature from about 0° C. to about 5° C., and removing othe lysozyme crystals which separate out of solution.

9. The process of isolating crystalline lysozyme from egg white which comprises dissolving sufficient sodium chloride in egg white to establish a concentration of about 5% of the salt, adding a base to adjust the pH to about 9 to about 11, allowing the solution to stand at a temperature of about 0° C. to about 5° C. and removing the lysozyme crystals which separate out of solution.

10. The process of isolating crystalline lysozyme from egg white which comprises dissolving sufficient sodium chloride in egg white to establish a concentration of about 5% of the sodium chloride, adding a base to adjust the pH to about 9 to about 11, allowing the solution to stand at about 4° C., and separating the lysozyme crystals which separate out of solution.

GORDON ALDERTON.
HARRY L. FEVOLD.

REFERENCES CITED

The following references are of record in the file of this patent:

Chem. Amstr., 1932, p. 5117, by Friederberger.
Linz, Chemical Abstracts, 1938, page 2963.
Alderton et al., Jr. Biol. Chem., V157, pp. 43–58 (1945).